No. 750,076. PATENTED JAN. 19, 1904.
J. P. ANNEN.
MACHINE FOR COATING CONFECTIONS.
APPLICATION FILED OCT. 12, 1903.
NO MODEL. 3 SHEETS—SHEET 1.

Witnesses:— John Mc Donald R. O. Wiley.

Inventor:— John P. Annen

No. 750,076. PATENTED JAN. 19, 1904.
J. P. ANNEN.
MACHINE FOR COATING CONFECTIONS.
APPLICATION FILED OCT. 12, 1903.

NO MODEL 3 SHEETS—SHEET 2.

Witnesses:
John McDonald
R. D. Wiley.

Inventor:
John P. Annen

No. 750,076. PATENTED JAN. 19, 1904.
J. P. ANNEN.
MACHINE FOR COATING CONFECTIONS.
APPLICATION FILED OCT. 12, 1903.
NO MODEL. 3 SHEETS—SHEET 3.
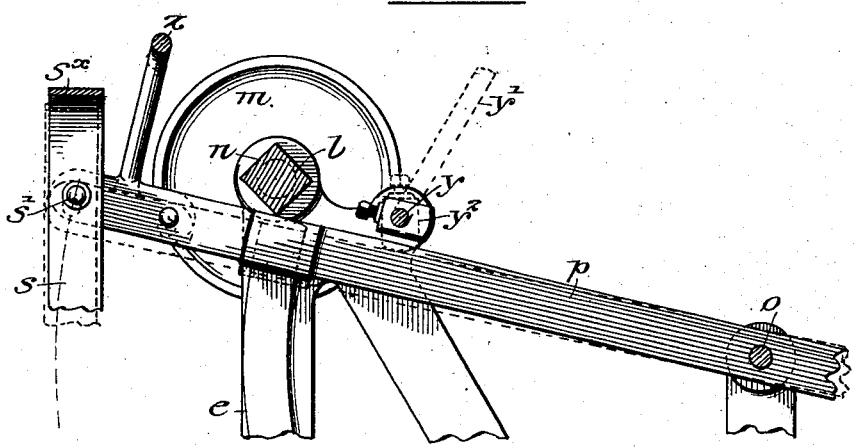
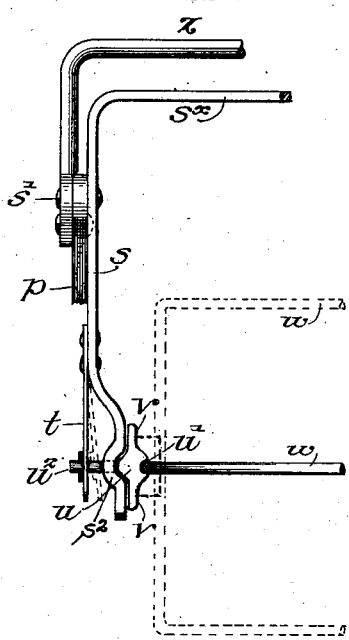
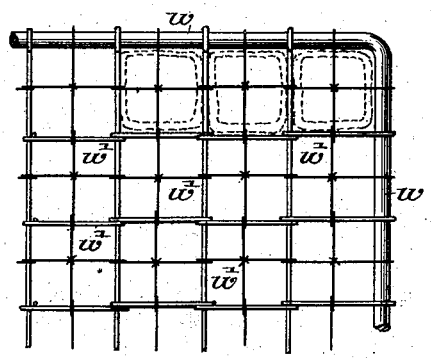
Witnesses:—
John McDonald
R. D. Wiley
Inventor.
John P. Annen No. 750,076. Patented January 19, 1904.

UNITED STATES PATENT OFFICE.

JOHN P. ANNEN, OF GREENBAY, WISCONSIN.

MACHINE FOR COATING CONFECTIONS.

SPECIFICATION forming part of Letters Patent No. 750,076, dated January 19, 1904.

Application filed October 12, 1903. Serial No. 176,722. (No model.)

*To all whom it may concern:*

Be it known that I, JOHN P. ANNEN, a citizen of the United States of America, residing at Greenbay, in the county of Brown and State of Wisconsin, have invented certain new and useful Improvements in Machines for Coating Confections, of which the following is such a full, clear, and exact description as will enable others skilled in the art to which it appertains to make and use the same, reference being had to the accompanying drawings, forming a part hereof, and in which—

Figure 1:
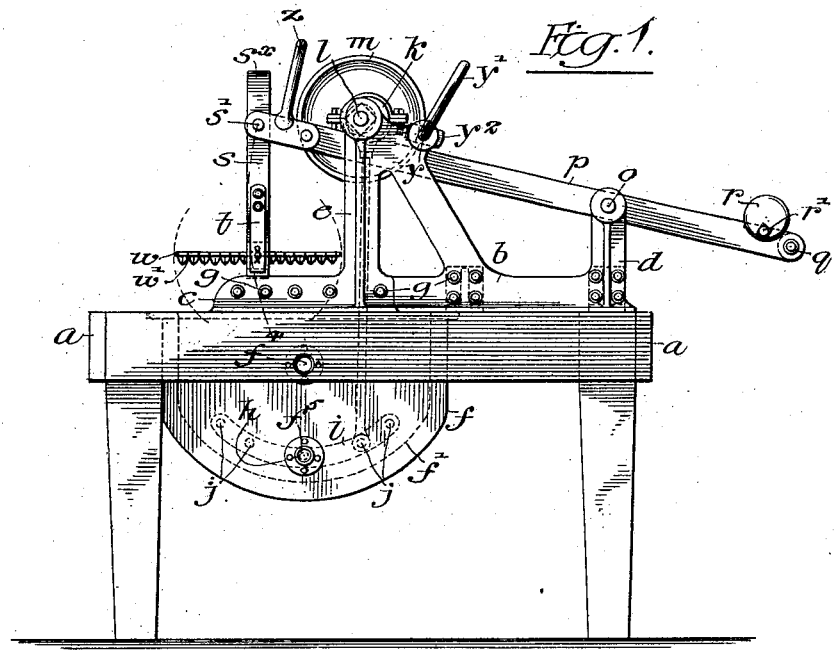
Figure 2:
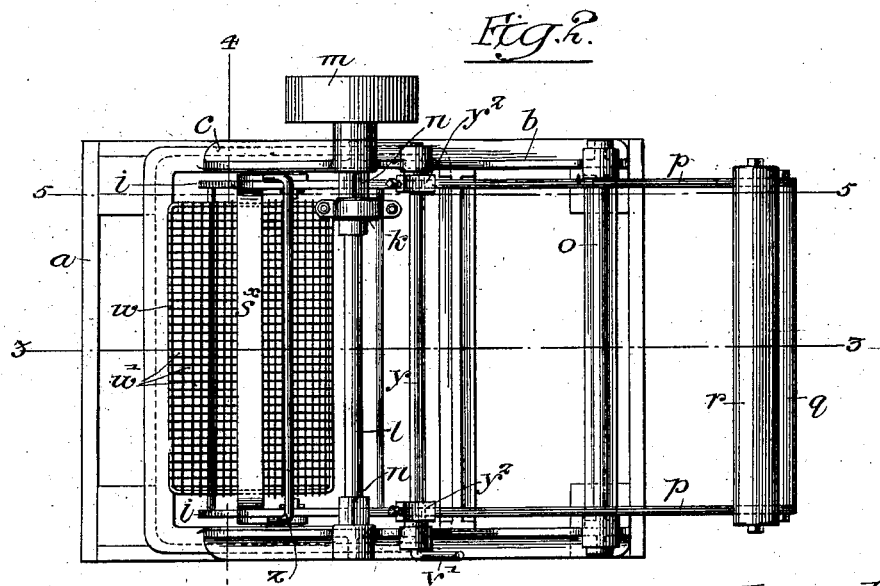
Figure 3:
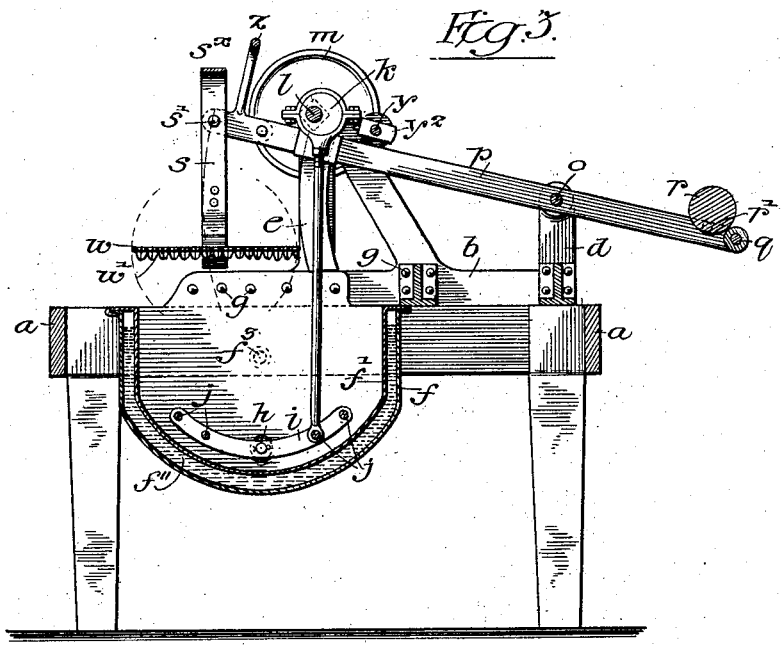
Figure 4:
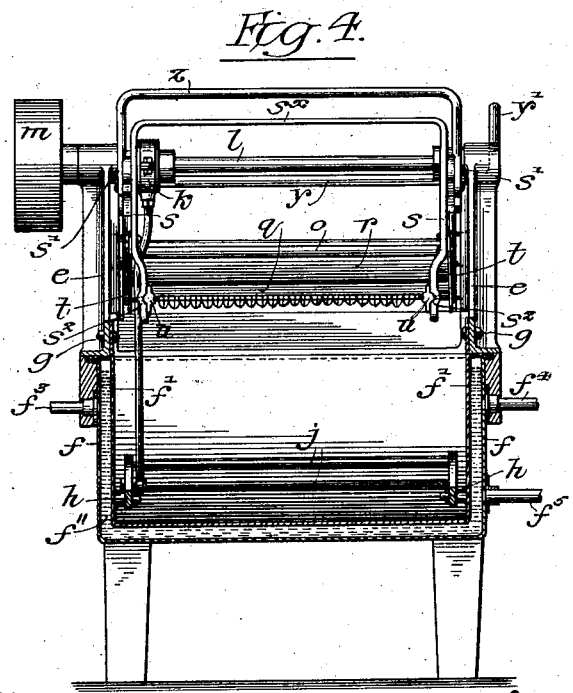

Figure 1 shows my said new device in side elevation with interior parts indicated in broken outlines. Fig. 2 shows my said device in plan view. Fig. 3 shows a longitudinal section on the plane 3 3 of Fig. 2. Fig. 4 shows a transverse section on the plane 4 4 of Fig. 2. Fig. 5 shows a longitudinal section on a plane 5 5 of Fig. 2 of a part of the upper part of Fig. 1 on an enlarged scale. Fig. 6 shows one member of the screen-holder and its revoluble mechanism, on an enlarged scale, in front elevation. Fig. 7 shows one corner of a screen on an enlarged scale, showing the details of construction of the individual baskets or holders of single pieces of confection.

Like reference-letters refer to like parts throughout.

The object of my invention is to improve the construction of the kind of mechanism used for coating caramels or confections with flavorings, as with chocolate, and like operations. The art or process by which such coating is accomplished is varied, often slow and expensive, and the machiney is also expensive. The chocolate coating is a thick liquid into which each individual piece must be dipped by itself or with which it must be brushed, and care must be taken to keep said liquid at a proper consistency, so that all surplus coating be removed promptly and properly and so as to leave the finished article in as neat and attractive a condition as possible. To attain said desirable ends, I construct my said new and improved machine in substantially the following manner, namely: Within a four-legged frame $a$, surmounted by cast-iron supporting-pieces $b$, which consist of right-angled longitudinal pieces $c$, formed of a vertical and a horizontal flange, from which rises a short vertical stud $d$ and a larger front stud $e$, and from the vertical flange depends a jacketed dipping trough or kettle $f$, secured to said element $b$ by bolts or rivets $g$, and within the outer part $f$ is an inner part $f'$, and between said parts $f f'$ is a space $f''$ for water or steam, into which pass the pipes $f^3 f^4 f^5$ to and from a boiler for either hot water or steam, and preferably for hot water, because the temperature to be secured therefrom for tempering the coating material in said trough is both under much easier control and of greater range of temperature, and therefore more desirable.

Near the concaved bottom of the interior of $f'$ and at each of its end walls are studs $h$, which pass through curved rocker-bars $i$, and said bars are connected transversely by a series of bars $j$, and to one of said curved bars is attached a pitman-rod at a suitable distance from its stud $h$, whereof its other end is connected to a strap embracing an eccentric $k$ on a shaft $l$, revolved in the studs $e$ by a pulley $m$, and on said shaft $l$ and against the inner side of said studs $e$ are four-sided cams $n$, and on a rod forming a fulcrum $o$ through the tops of the posts $d$ vibrate oscillating bars $p$, which reach back some distance, where they are connected by a cross-bar $q$ and are provided on their top edge with an adjustable weight $r$ in the form of a roller, with notches to fit over the top edges of said bars, to which it is held by set-screws $r'$. The front ends of said oscillating bars $p$ pass forward and upward and under the cams $n$ and end on each side of and hold pendent oscillating arms $s$ on pivots $s'$ in the front ends of said bars $p$, and said arms are connected by an integral top member $s$, and thereby is formed an element like a basket-handle and means for connectedly oscillating the free ends of the arms $s$.

The lower ends of the arms $s$ are set inward from the straight flat spring $t$ on the outer side of said arms, and near their ends are outwardly-bent segments or concave receptacles $s^2$, into which said springs draw the convex part $u$ of a block provided with a pin $u^2$, passing through the spring $t$, and opposite said part $u$ is a notch $u'$ to receive the end of a screen $w$, provided with baskets $w'$, made of one or two sets of wires to receive individual pieces of confection to be coated. On said parts $u$ $u'$ are lugs $v$, which lie on the flat straight parts of the arm $s$ above and below the segmental part $s^2$. On the part $e$ is also mounted a shaft $y$, and on it over the bars $p$ are attached cams $y^2$, which turn with said shaft by means of a handle $y'$ from a vertical to a horizontal position, and thereby through the effect of the weight $r$ throw the edges of the arms $p$ against the cams $n$, whereby when revolving said cams $n$, through the effect of the weight $r$, cause short and rapid vibrations of the front ends of the bars or arms $p$, on which is hung the basket mechanism $w$ $w'$, and near the front ends of said arms $p$ is a rigid bar $z$, with descending arms fastened to the ends of said arms $p$ to form a handle to vibrate by hand the arms $p$, so as to dip the basket mechanism $w$ $w'$ into the trough $f'$.

The operation of my said new device is substantially as follows, namely: The trough $f'$ being charged with the desired liquid coating material and the basket mechanism charged with blocks of confections, when the coating material is of the right temperature and consistency the machine is set in motion by the pulley $m$, which sets the stirring mechanism $i$ $j$ in motion. The handle $z$ is then seized and depressed to dip the basket mechanism into the coating liquid. The handle is then released, which brings the arms $p$ against the cams $n$, which by their rotation will shake off all surplus material brought out with the basket mechanism, the shaft, with its cam $y^2$, having first been turned into the horizontal position shown in Figs. 1, 3, and 5 from the position indicated in broken outlines. (Indicated in Fig. 5.) When the dipped material has been sufficiently shaken and relieved of its surplus material, the front edge of the frame $w$ is raised by hand, the parts $u$ $s^2$ being so shaped that they will yield to such force, yet never turning on the pins $u^2$ without such applied force, and the parts $w$ $w'$ turned upside down to discharge their contents on a board first placed under said baskets, covered with waxed paper, to receive the now finished product of my machine. The oscillating motion of the arms $s$ on the pins $s'$ enables the workman to discharge the dipped product more easily and quickly.

The stirring mechanism may be varied indefinitely from the form herein shown without avoiding the essential principle of my invention.

What I claim is—

1. The combination with a trough and machine-supporting members thereon, united to said trough, of adjustably-weighted and vertically-reciprocable arms pivoted transversely to vertical oscillatable arms, a screen in the free ends of said arms and spring-actuated mechanism to frictionally hold said screen in horizontal position, substantially as specified.

2. The combination with a trough and machine-supporting mechanism thereon, united to said trough, of adjustably-weighted and vertically-reciprocable and cam-vibratable arms transversely set to vertical oscillatable screen-holding arms, a screen, and spring-actuated mechanism to frictionally hold and release said revoluble screen, substantially as specified.

3. The combination with a trough provided with agitating mechanism and machine-supporting members thereon, of adjustable weighted arms and vertically-reciprocable and cam-vibratable arms, a screen in the free ends of said arms, and spring-actuated mechanism to frictionally hold said screen in horizontal position, substantially as specified.

4. The combination with a double-bottomed trough provided with agitating mechanism, and machine-supporting members thereon, of adjustably-weighted arms and vertically-reciprocable and cam-vibratable arms, a screen in the free ends of said arms, and spring-actuated friction mechanism to hold and release said screen, rotatably, on the axis of said spring-actuated mechanism, substantially as specified.

In testimony whereof I have signed this specification in the presence of two subscribing witnesses.

JOHN P. ANNEN.

Witnesses:
 EDNA M. HAYES,
 WALTER E. DE LAIR.